Feb. 22, 1966        H. A. ELLIOTT ETAL        3,237,010
NAVIGATIONAL SYSTEM USING INFRA-RED HORIZON SENSORS
Filed Feb. 12, 1962                              4 Sheets-Sheet 1

INVENTORS:
HAROLD A. ELLIOTT
KENNETH G. HELLER
MARVIN D. EWY
BY WILLIAM SNYDER

Meelin and Hanscom
ATTORNEYS

INVENTORS:
HAROLD A. ELLIOTT
KENNETH G. HELLER
MARVIN D. EWY
BY WILLIAM SNYDER

Meelin and Hanscom
ATTORNEYS

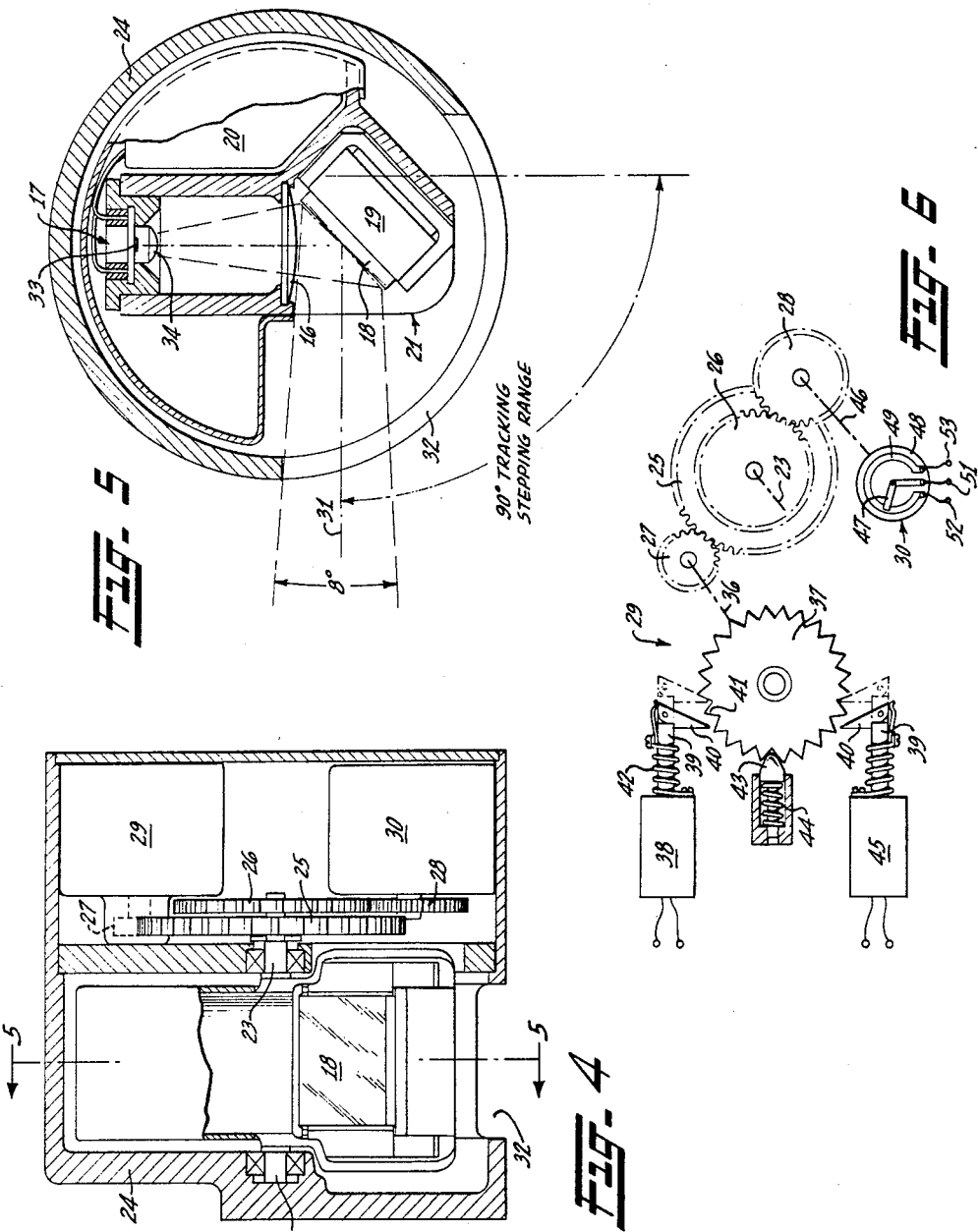

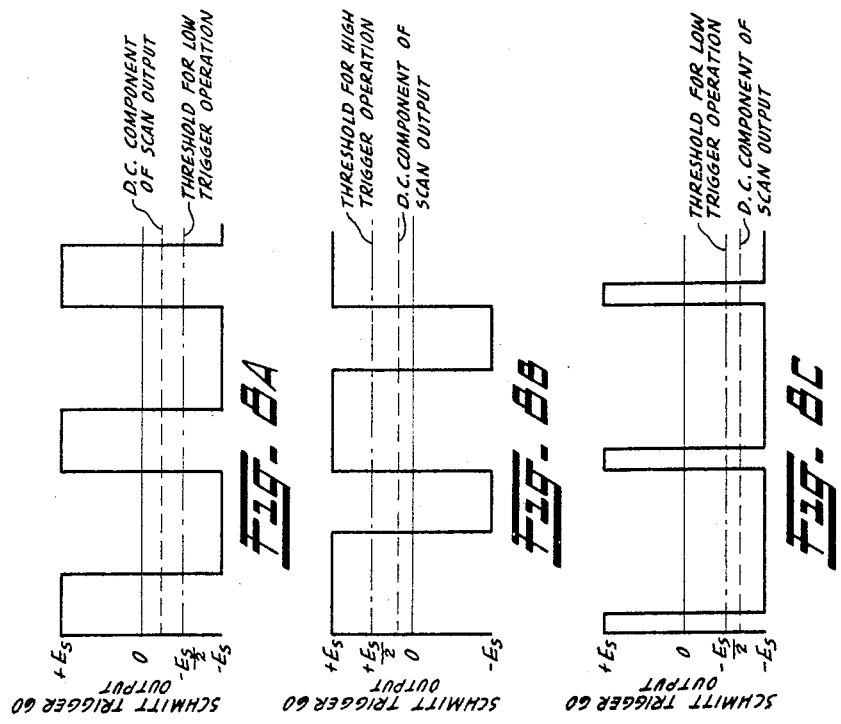
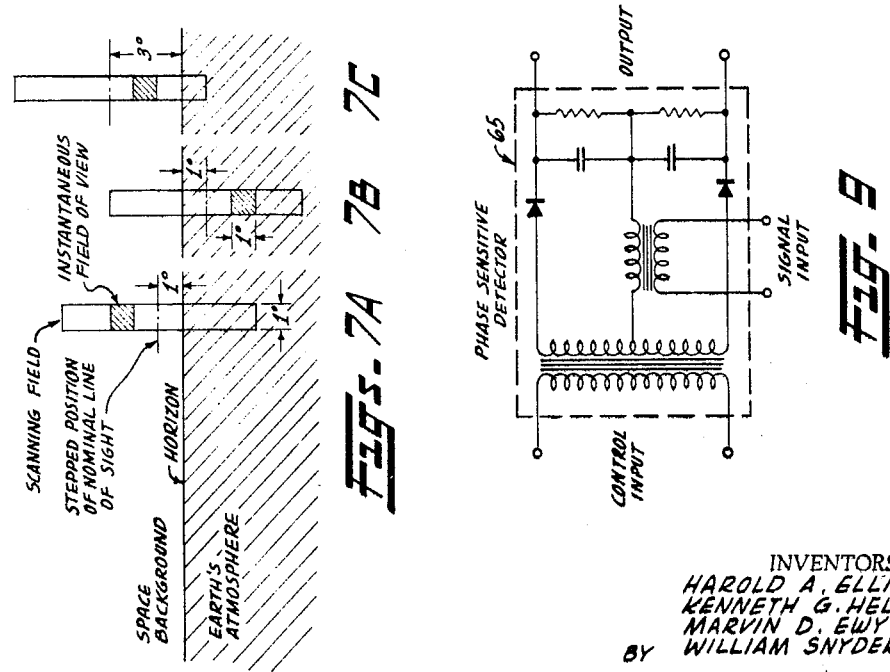

United States Patent Office 3,237,010
Patented Feb. 22, 1966

3,237,010
NAVIGATIONAL SYSTEM USING INFRA-RED
HORIZON SENSORS
Harold A. Elliott and Kenneth G. Heller, Redwood City, Marvin D. Ewy, San Mateo, and William Snyder, Palo Alto, Calif., assignors to American Radiator & Standard Sanitary Corporation, New York, N.Y., a corporation of Delaware
Filed Feb. 12, 1962, Ser. No. 172,664
11 Claims. (Cl. 250—83.3)

This invention relates to navigational apparatus, and more particularly to a navigational system for use in missiles, space vehicles or the like wherein the horizon of the earth is sensed and used as a reference for navigation.

The primary object of this invention is to provide a non-gravitational navigational system wherein a plurality of tracker units in a vehicle scan and detect the horizon at spaced points thereon, and wherein electrical signals corresponding to the tracker positions are correlated by a computer unit to indicate the altitude and attitude of the vehicle.

A further object of the invention is to provide an improved tracker unit for the above system.

Yet another object of the invention is to provide a tracker unit which senses the infra-red discontinuity existing at the horizon of the earth, and which can track such discontinuity during relative shifting of the space vehicle and the horizon.

Another object of the invention is in the provision of a tracker unit which scans through a relatively large arc in incremental steps so that the line of sight of said tracker unit can be brought into close proximity to the horizon and which also oscillates through a limited arc so that the line of sight of the tracker unit will then oscillate up and down across the horizon when the tracker unit has been stepped into close proximity with the horizon. Electrical signals indicating the number of incremental steps from vertical and electrical signals derived from the interception of the horizon by the oscillation of the tracker unit at a step position thereof are transmitted to the control unit of the vehicle, so that the exact position of the vehicle relative to the horizon can be determined.

A still further object of the invention is to provide a tracker unit for the above which will automatically start a searching mode of operation to find the horizon if the horizon should suddenly be lost by the tracker unit as, for example, if there were a sudden tilt of the vehicle relative to the earth.

Still another object of the invention is to provide a tracker unit responsive to the infra-red discontinuity at the horizon of the earth which will track such horizon and which will not track false horizons, i.e., the infra-red discontinuities presented by the sun, moon or shore lines of the earth.

Other objects and advantages will become apparent in the course of the following detailed description.

In the drawings, in which like parts are designated by like reference numerals throughout the same:

FIG. 4 is a view illustrating the arrangement of the mechanical elements of one of the tracker units of the present invention.

FIG. 5 is a sectional view of FIG. 4, taken on the line 5—5 thereof.

FIG. 6 is a generally schematic and perspective view of the stepping motor and the step position indicator of a tracker unit.

FIGS. 7A, B and C are diagrammatic representations of the scanning field of view of one of the tracker units superimposed on the earth's horizon, showing the nominal line of sight of the scanner as being slightly above, slightly below, and substantially above the horizon, respectively.

FIGS. 8A, B and C illustrate the pulsating wave generated by the tracker unit and the filtered D.-C. component thereof for the three positions of the nominal line of sight of the tracker unit relative to the horizon which are illustrated in FIGS. 7A, B and C, respectively.

FIG. 9 is a schematic drawing of a phase sensitive detector usable in the invention for searching purposes.

In general, the navigation system of the present invention consists of a plurality of tracking units mounted in a space vehicle to scan the horizon at spaced points thereon. When the vehicle is properly aligned with the vertical, the line of sight of each tracking unit can vary through any desired range of depression angles in a vertical plane having a constant azimuth angle with respect to the vehicle coordinates.

Figure 1:
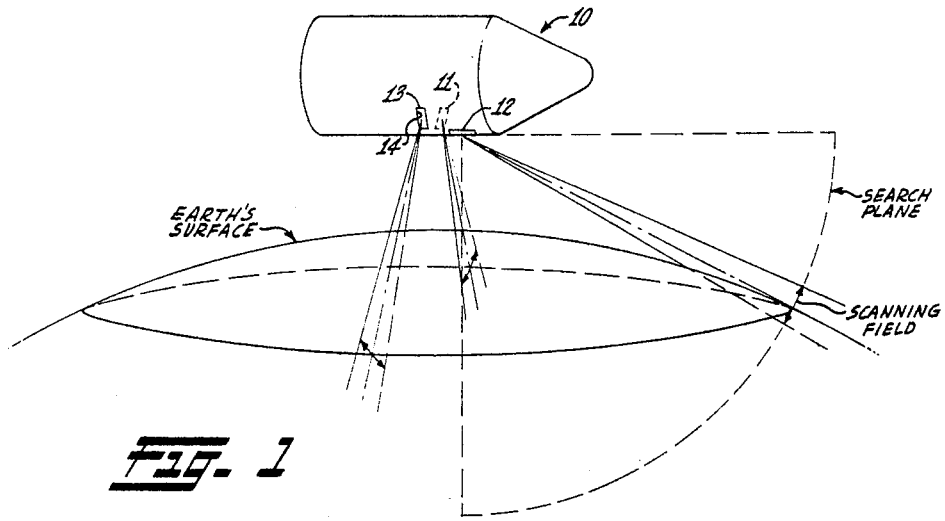
FIG. 1 is a general view illustrating a space vehicle incorporating an embodiment of the present invention and showing the scanning pattern of the tracker units.

FIG. 1 illustrates a space vehicle 10 having three tracking units 11, 12 and 13, with their lines of sight directed towards the horizon at points that are 90° apart. Although the tracking units can be disposed adjacent to one another, they may also be placed at widely separated points on the vehicle if desired. Narrow slot apertures 14, flush with the outer surface of the vehicle, enable the tracking units to be disposed wholly within the vehicle.

Theoretically, attitude and altitude information is available whenever any three distinct points on the horizon are being viewed. However, in order to achieve the maximum degree of accuracy, the three points should be separated by at least 90° in horizon azimuth.

Each of the tracking units is mounted to track the horizon in a search plane that is fixed relative to the axes of the space vehicle. The tracking units each include a scanning member which is subjected to both a constant oscillation in the search plane about the nominal line of sight of the scanning member and which is movable through incremental steps in the search plane. In the operation of the system, each scanning member is moved stepwise so as to bring its nominal line of sight into close proximity with the horizon. In this application the expression "nominal line of sight" of the scanning member means the line of sight of said member if it were not subjected to its oscillatory movement. The oscillations of the scanning member will now cause the instantaneous line of sight of the member to sweep back and forth across the horizon. Suitable circuitry then provides a measure of the amount of angular deviation between the nominal line of sight of the scanning member and the horizon and sends this information, together with information as to the number of incremental steps of the scanning member from horizontal, to the computer unit 15 of the vehicle.

Figure 2:
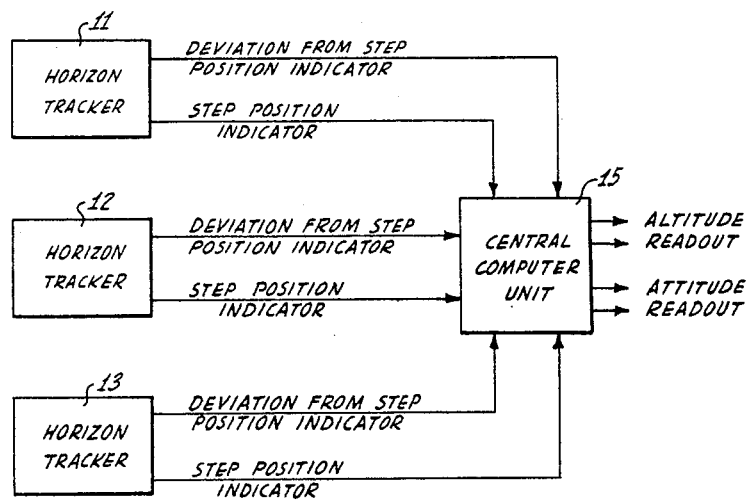
FIG. 2 is a block diagram of the over-all navigational system.

This step information and deviation of horizon from step position information (i.e., step and vernier voltages) from each tracker unit is then processed in a customary manner to compute the instantaneous altitude and attitude of the space vehicle (see FIG. 2). As is conventional, this latter information is then compared to the predetermined desired altitude and attitude for the vehicle at the moment, with corrections being made to realign the vehicle if there is a significant difference between the actual and desired altitude and attitude of the vehicle.

In the event that the deviation between the nominal line of sight of the scanning member and the horizon increases beyond a given amount at any step position of a scanning member, the scanning member is then automatically stepped in a direction to bring the nominal line of sight thereof back towards the horizon.

In addition to the tracking mode described above, the tracking members are also designed to initiate a search mode in the event that a sudden tilt of the vehicle should throw the scan pattern of a tracker completely off the horizon. If this occurs, the scanning member will move to the upper limit of its travel and then step downward toward the nominal vertical until the horizon is picked up. Once picked up, the scanning member will revert to its tracking mode.

*Mechanical details of the tracker units*

The mechanical construction of each tracker unit is identical and is best seen in FIGS. 4 and 5 wherein tracker unit 11 is illustrated.

A telescope 16, detector 17, scanning mirror 18, mirror oscillator 19 and amplifier 20 are all mounted on sub-frame 21, which is provided with stub shafts 22 and 23 journaled in case 24. Gears 25 and 26 on shaft 23 are in meshing engagement with gears 27 and 28 of the stepping motor 29 and step position indicator 30, respectively.

By operation of the stepping motor 29, the entire sub-frame 21 is caused to rotate through 90° within the case 24, so that the nominal line of sight 31 of mirror 18 can sweep from an upper limit to vertical and back. The case 24 is mounted in the space vehicle so that the horizontal position of the mirror and the horizontal axis of the vehicle are the same. The case 24 is provided with a window 32 extending approximately 100° therearound in the path of the line of sight of the mirror. The plane of search of the mirror is perpendicular to the axis of rotation of sub-frame 21.

The scanning mirror 18 reflects a 1° by 1° instantaneous field of view into telescope 16, to which the mirror is disposed at a nominal angle of 45°. The mirror is mounted on an oscillating motor 19 for oscillating movement through a range of ±2° about an axis parallel to the shafts 22 and 23, which movement effects a ±4° oscillation of the instantaneous field of view relative to the nominal line of sight of the mirror. This oscillating scan pattern is illustrated in FIG. 7A wherein the 1° by 1° instantaneous field of view sweeps back and forth over the total 1° by 8° scanning field. The nominal line of sight indicated is intermediate the extents of the scanning field and would represent the center of the field of view if there were no oscillatory movement of the mirror.

Inasmuch as the details of the mirror oscillator 19 form no part of the present invention, such details have not been illustrated. Any conventional device for this purpose may be used to impart the desired oscillations to the mirror. For example, the mirror may be mounted in the rotor of a permanent magnet-type torquer. Such a rotor consists of a very thin form on which is wound a coil of fine wire. The stator of the torquer has a stationary permanent magnet inside the coil. An alternating current applied to the low inertia coil causes the coil to move around the stationary magnet as the torque produced by the current. The torque is linearly proportional to the current, and at any given current is essentially constant over the few degrees of movement here involved.

The coil is preferably carried flexibly on a cross spring suspension to dispense with bearings. The spring force of the suspension provides the principal resistance to the applied torque and establishes the deflection amplitude. The spring constant is matched to the inertia of the coil and mirror to give a resonant frequency substantially higher than the desired 10 cycles per second scanning frequency of the instrument. A sinusoidal excitation signal of the latter frequency and of an appropriate strength is applied to cause the coil and the mirror to oscillate through ±2°. To insure that there will be negligible oscillation or rotational response to input vibrations or accelerations the device should be made as symmetrical as possible about its output axis.

The optical means of telescope 16 of the present embodiment consists only of a simple germanium objective lens and the detector 17 consists of a square shaped thermistor bolometer 33 disposed in a germanium immersion lens 34 situated at the focal point of the objective lens. The detector performs a transducing function of converting variations of radiation into electrical voltage variations. The output of the bolometer is connected to the amplifier 20 mounted on sub-frame 21.

Depending upon the operational environment requirements, it may be advantageous to use a rectangular thermister bolometer, with the long side of the resultant field of view parallel to the horizon. A rectangular cell biased along the long dimension provides a larger cell signal, although at the expense of requiring operation at higher impedance levels. On the other hand, a rectangular cell biased along the short dimension provides the same cell signal as a square cell of the same width, but allows operation at a lower impedance level. Either biasing requires more bias power than would be needed for a square cell.

The disposition of the lens 16 between the mirror 18 and detector 17 has an important advantage in that it enables good focus to be maintained throughout the whole search field.

The stepping motor 29, illustrated schematically in FIG. 6, comprises a shaft 36 with toothed wheel 37 and output gear 27 mounted thereon. An "up" solenoid 38 is disposed so that the plunger 39 thereof is generally tangent to the wheel 37. When the solenoid is energized, the plunger 39 will move to the right, from its illustrated de-energized position, to the dotted line position, causing pawl 40 to engage a tooth 41 and push the wheel through approximately a one-tooth advance. When the solenoid is de-energized, the plunger returns to its de-energized position by retract spring 42. Pawl 40 is free to pivot in a counterclockwise direction on plunger 39 and thus rides over the next tooth.

A detent member 43 is forced by spring 44 into radial engagement with the toothed periphery of wheel 37. The size of the detent member 43 and the force of spring 44 are such that the wheel 37 would normally be forced into a position in which the point equidistant from the center of two adjacent teeth is exactly opposite the center of detent 43. The force of the solenoid plunger 39 will overpower the detent spring 44 and will push the wheel far enough so that the detent will position it exactly one tooth width from its previous position.

A "down" solenoid 45 is provided, as above, to rotate the wheel 37 in the opposite direction when energized. Such rotation is permitted by the "up" solenoid since the pawl 40, when in its de-energized position, is out of the way of the teeth of wheel 37.

Thus, depending upon which solenoid is energized, the toothed wheel 37 is advanced in a given direction through a one-tooth advance. By a suitable gearing ratio between gears 27 and 25, a one-tooth advance of wheel 37 will cause the sub-frame 21 to rotate through a 2° increment. No further rotation will occur until the solenoid is de-energized and then re-energized.

Various step position indicating devices may be employed to give an electrical signal indicative of the step position of sub-frame 21. One particular example is illustrated in FIG. 6, wherein gear 26 on sub-frame shaft 23 drives gear 28 whose shaft 46 is directly connected to the rotating contact arm 47 of potentiometer 48. As sub-frame 21 rotates, the contact arm 47 will slide over the resistance element 49 so that the resistance between the contact arm terminal 51 and the resistance element terminals 52 and 53 will vary in correspondence with the change in step position of the sub-frame. By a suitable choice of gearing, the 90° rotation of the sub-frame will produce slightly less than 360° of contact rotation in order to increase the precision of the step position indicator.

*Electronic details of the tracker units*

Figure 3:
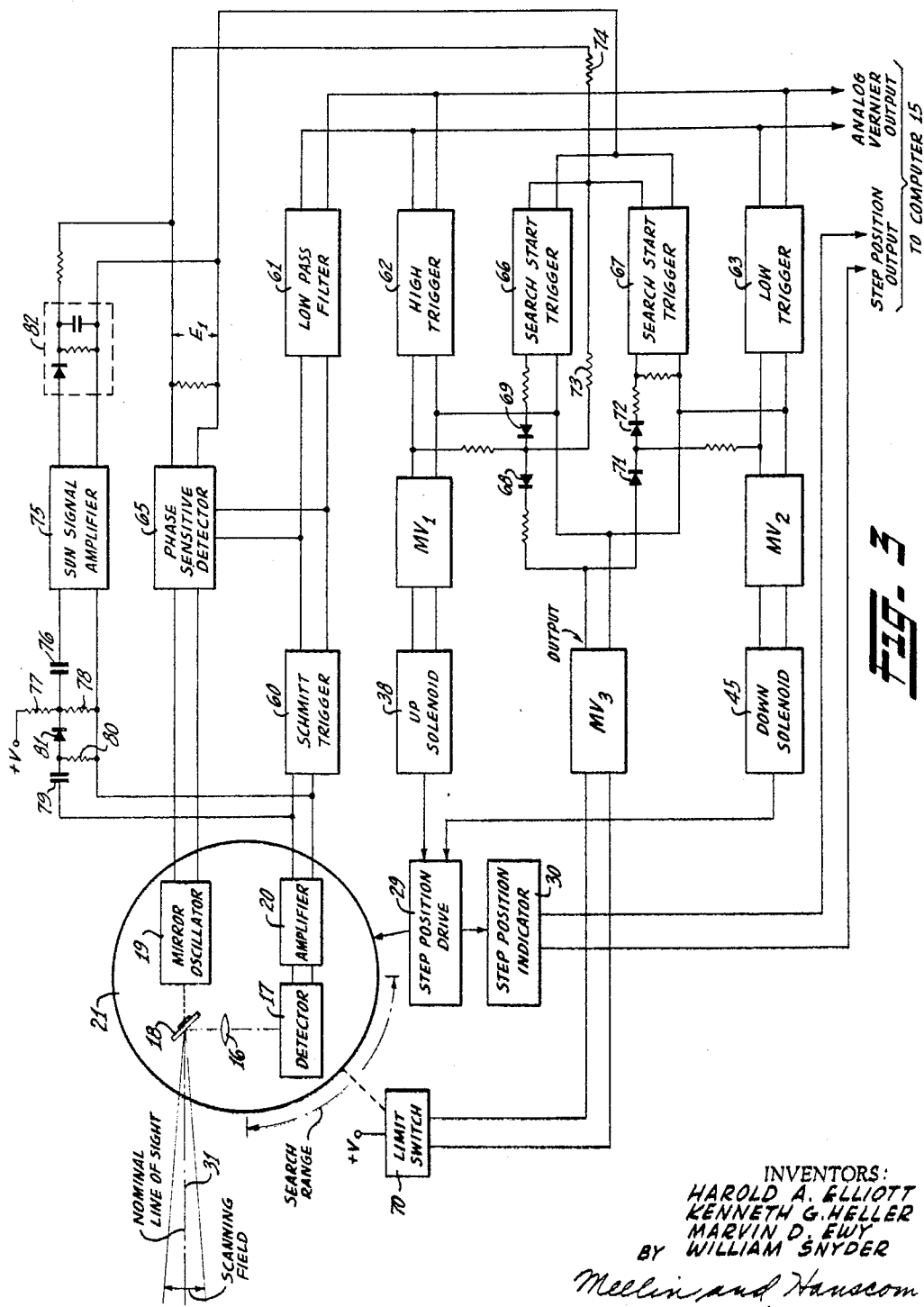
FIG. 3 is a block diagram of one of the tracker units of the present invention.

The electronic details of the tracker units are identical and are best illustrated in FIG. 3.

Assuming thtat the oscillating mirror 18 is directed generally towards the earth's horizon, so that the instantaneous line of sight of the mirror sweeps up and down across the horizon, the infra-red radiation from the earth will be reflected onto the thermistor bolometer 33 of the detector 17 whenever the mirror is pointing below the horizon. During the portion of the cycle when the mirror is directed above the horizon, i.e., pointing out into space, essentially no infra-red radiation will be received by the detector. The detector will generate a trapezoidal wave which is then amplified by a conventional transistor amplifier 20. If the nominal line of sight is aligned exactly with the horizon, the positive and negative portions of the trapezoidal wave will be equal in duration. If the nominal line of sight is above the horizon, then the negative portion of the wave will be of a longer duration than the positive portion of the wave, with the ratio between the positive and negative portions of the cycle being proportional to the deviation of the nominal line of sight from the horizon. The converse is true if the nominal line of sight is below the horizon.

The output of the amplifier is then applied to the input of the bistable trigger circuit 60. This is preferably a Schmitt trigger circuit having outputs of $+E_s$ or $-E_s$. The trigger circuit is set to trigger on to a positive $E_s$ output whenever the input is larger than zero volt and to trigger off to a negative $E_s$ output whenever the input is less than zero volt. Accordingly, the output of the Schmitt trigger 60 will be a rectangular wave having constant positive and negative peaks of duration equal to the positive and negative portions of the amplified wave from the detector. The D.C. component of this wave will, of course, be proportional to the difference in duration between the positive and negative peaks. The Schmitt trigger output is then fed to the input of a conventional low pass filter 61 to produce this D.-C. component as its rectified output.

The D.-C. output of filter 61, like the outputs of the detector 17, amplifier 20 and Schmitt trigger 60, is proportional to the deviation angle between the nominal line of sight of the tracker unit and the horizon, and represents the vernier output of the tracker unit which is applied to the computer unit 15. FIGS. 7A, 7B and 7C illustrate several positions of the scanning field of a tracker unit superimposed on earth's horizon showing the nominal line of sight of the tracking unit to be 1° above, 1° below and 3° above the horizon, respectively. FIGS. 8A, 8B and 8C then illustrate the corresponding outputs of the Schmitt trigger 60 and the D.-C. component thereof produced by the low pass filter 71.

At the same time, a step position indication proportional to the number of steps from horizontal of the tracker unit is applied to computer 15 by means of the potentiometer 48, whose contact arm is coupled for rotation with the tracker unit.

These two signals, one proportional to the stepped deviation from the horizontal of the nominal line of sight and the other proportional to the deviation of the horizon from the nominal line of sight are then combined by conventional circuits in the computer 15 to give an indication of the exact deviation from horizontal of the space vehicle to the horizon.

As long as the deviation from the nominal line of sight and the horizon remains within ±2°, the tracking unit will remain at a given rotative step from horizontal. If, however, the deviation from horizontal increases to more than ±2°, then the tracking unit will be automatically stepped to bring the nominal line of sight thereof back to the horizon, as follows.

The output of the low pass filter 61 is applied to the high and low trigger circuits 62 and 63 shown in FIG. 3. These trigger circuits are also bistable multivibrator circuits operating between constant plus and minus output voltages. The high trigger 62 is designed with an input threshold such that when the input voltage thereto is greater than $+E_s/2$ the output thereof will go positive and when the input voltage decreases below $+E_s/2$ the output goes negative. The low trigger 63 has an input threshold of $-E_s/2$ so that when the applied input thereto is more negative than $-E_s/2$ the output of the low trigger goes negative and when the input rises above $-E_s/2$ the output goes positive.

For convenience in following the following description of operation, the corresponding gating and output voltages of the various trigger circuits in the tracker unit are summarized below.

| | Input Gating Voltage | Output Voltage When Gated |
|---|---|---|
| Schmitt trigger 60 | >0 | $+E_s$. |
| | <0 | $-E_s$. |
| Higher trigger 62 | More pos. than $E_s/2$ | +. |
| | More neg. than $E_s/2$ | -. |
| MV1 | + | Free running. |
| | - | + or -. |
| Low trigger 63 | More neg. than $-E_s/2$ | -. |
| | More pos. than $-E_s/2$ | +. |
| MV2 | - | Free running. |
| | + | + or -. |
| Search start trigger 66 | $-E_1$ | -. |
| | More pos. than $-E_1$ | +. |
| Search start trigger 67 | $-E_1$ | +. |
| | More pos. than $-E_1$ | -. |
| MV3 | 0 | 0. |
| | + | One shot negative pulse. |

The high trigger 62 is connected to a free running multivibrator MV1 in such manner that when the high trigger goes positive, MV1 will produce a series of pulses until the high trigger goes negative. MV1 is connected to the "up" solenoid 38 so that each pulse from MV1 will cause the tracking unit to step 2° upwardly from horizontal.

Similarly, the low trigger 63 is connected to a free running multivibrator MV2 in such manner that MV2 will generate a sequence of pulses if the low trigger goes negative, such sequence ending when the output of the low trigger returns to its positive state. The output of MV2, in turn, is connected to the "down" solenoid 45.

To illustrate the operation of a tracker unit, let it be assumed that the nominal line of sight of the tracking unit is at a deviation of 3° above the horizon, as shown in FIG. 7C. The D.-C. component of the output of the Schmitt trigger 60 will be more negative than the threshold voltage $-E_s/2$ of the low trigger 63, causing this bistable trigger to go from its normal positive to its negative output state, in turn causing free running multivibrator MV2 to start into operation. The first pulse from MV2 energizes the "down" solenoid to step the tracker unit downwardly 2°, bringing the nominal line of sight of the scanning mirror down to 1° above the horizon.

The output from the low pass filter 61 rises above $-E_s/2$, returning the low trigger to its normal state and stopping the running of MV2.

In the same manner, if the nominal line of sight is pointing more than 2° below the horizon, the resulting high positive output from the low pass filter 61 turns on the high trigger to cause MV1 to energize the "up" solenoid, returning the nominal line of sight of the tracker unit towards the horizon.

Thus, as described, the tracker units will track the horizon by stepwise movement of the nominal line of sight of the trackers as long as the relative shifting movement between the space vehicle and the earth is sufficiently slow so that the trackers can be stepped back towards the horizon before the horizon is lost from the 1° by 8° scanning field.

In the event that there is a sudden shift of the position of the space vehicle, as from a collision with a meteor, such that the horizon is lost by one or more of the tracker units, these units will automatically start into a search mode to refind the horizon.

As previously discussed, whenever the horizon is within the scanning field the Schmitt trigger 60 will produce a rectangular wave which is applied to the signal input of a conventional phase sensitive detector 65, the details of which are shown in FIG. 9. At the same time the sinusoidal excitation signal which operates the mirror oscillator 19 is applied to the control input of the phase sensitive detector. The output of this detector is in general proportional to the signal input times the cosine of the phase angle between the signal input and the control input. In the present invention this angle is either 0 or 180° depending upon whether the space vehicle is right side up or inverted relative to the horizon. In normal right-side-up position of the vehicle, the control and signal inputs are 180° out of phase with the result that the phase sensitive detector has a $-E_1$ output. If the control and signal inputs are in phase, then the output of the detector will be $+E_1$.

In the event that the horizon is lost from the scanning field, the rectangular wave output of the Schmitt trigger 60 applied as a signal voltage to the phase sensitive detector 65 ceases, causing the negative $E_1$ output of the detector to disappear. The bistable search start trigger circuits 66 and 67 (having normal negative and positive voltage outputs, respectively) are activated by this disappearance of the negative $E_1$ voltage and flip into output states of negative and positive voltages respectively. The one shot multivibrator MV3 has a normal zero output, and the positive voltage now appearing between the diodes 68 and 69 is applied to the input of free running multivibrator MV1 causing it to start into pulse production. These pulses repeatedly energize the "up" solenoid 38 to step the sub-frame 21 of the tracker unit back to its upper limit position in the space vehicle.

When the sub-frame 21 reaches its horizontal position a limit switch 70 is actuated by the sub-frame to apply a positive voltage to the input of the one shot multivibrator MV3 so that a negative pulse of relatively long duration is generated at the output of MV3. This negative output of MV3 drops the voltage between diodes 68 and 69 below the threshold input of free running multivibrator MV1 so that no more pulses are applied by MV1 to the "up" solenoid 38.

At the same time, the negative output of MV3, together with the negative output of the search start trigger 67 drops the voltage between the diodes 71 and 72 to a value more negative than the input threshold of MV2, causing this free running multivibration to produce a series of pulses, which, when applied to the "down" solenoid 45, steps the tracker unit sub-frame 21 from its horizontal towards its vertical position.

As soon as the horizon is picked up in the scanning field of the tracker a rectangular wave is produced at the output of the Schmitt trigger 60, causing the negative output $E_1$ at the phase sensitive detector 65 to be restored. Both search start triggers 66 and 67 are returned to their normal "off" states, with negative and positive outputs, respectively, thus removing the gating excitation from MV2 so that the stepping movement of the tracker ceases. The tracker unit now operates in its tracking mode previously described.

After a sufficient length of time the output of MV3 returns to its normal zero condition. As may be appreciated, the one shot multivibrator MV3 is designed so that the length of its negative output pulse is sufficient to allow the negative output of search start trigger 67 to gate MV2 on throughout its 90° of search, if necessary.

Since the search start triggers 66 and 67 will only be returned to their off states by a negative $E_1$ voltage applied to their inputs, it is thus apparent that the search mode will end only if the space vehicle is right side up relative to the earth. If the vehicle is inverted, a positive voltage $E_1$ will appear at the output of the phase sensitive detector when the horizon is intercepted, but this positive voltage will not return the triggers 66 and 67 to their normal "off" state. Instead, the free running multivibrator MV2 will continue to step the tracker unit to its vertical position relative to the vehicle. When the output pulse of MV3 decays sufficiently, the negative output of search start trigger 66 will again gate MV1 on to start a new search cycle. Searching will then continue until the horizon is intercepted by the tracker unit and the vehicle is right side up.

In addition to its ability to discriminate between right-side-up and inverted interception of the horizon, the tracker unit is also able to discriminate between the earth-space horizon and false horizons such as the infra-red discontinuity produced by a shore line on the earth or the sun-space and moon-space discontinuities.

In the event that the space vehicle should be shifted such that the nominal line of sight of a tracker should be directed considerably below the earth-space horizon, i.e., pointed at the earth, then the search mode will automatically start, due to the disappearance of the negative voltage $E_1$, so that the tracker steps towards its horizontal position in the vehicle. During this first portion of the search mode the lines of sight of the scanning mirror may intercept a shore line between a land and water surface of the earth. Due to the difference in emissivity of these surfaces the shore line would appear as a false horizon and would cause a rectangular wave to be produced by the Schmitt trigger 60, which in turn would re-establish a negative voltage $E_1$ at the output of the phase sensitive detector 65. To prevent this negative voltage from restoring the search start trigger 66 to its "off" position, resistors 73 and 74, FIG. 3, provide a holding circuit for search start trigger 66. The values of these resistors are chosen so that the positive voltage appearing at the junction of diodes 68 and 69 (after the initial gating of trigger 66 by a positive voltage $E_1$) is sufficient to maintain the input to trigger 66, i.e., the junction of resistances 73 and 74, at a positive value even though a negative voltage $E_1$ appears at the output of the phase sensitive detector 65.

In this manner the tracker unit will continue to step to its horizontal position in the vehicle even though false or real horizons may be detected. During the remainder of the search cycle from horizontal back downwardly to vertical, the one shot multivibrator MV3 will have produced a negative pulse lowering the voltage at the junction of diodes 68 and 69 and thus also at the junction of resistances 73 and 74 so that a negative voltage at the output of the phase sensitive detector 65 will restore the search start triggers 66 and 67 to their normal "off" position.

Since the search mode can only be terminated during the stepping movement from horizontal to vertical, these shore lines will not be incorrectly tracked, since the earth-space horizons would always be intercepted first.

The present invention also discriminates against the sun-space infra-red discontinuity which might otherwise be tracked by the tracker. Although the disc of the sun, from the distance of the earth, subtends only a ½° angle, the infra-red target would be considerably larger due to the infra-red radiation of the corona. As a consequence, a tracker could seize upon the sun as a false earth-space horizon unless compensation were provided. In the present invention this is accomplished by the sun signal amplifier 75, which generates a positive voltage to oppose the negative voltage $E_1$ generated by the phase sensitive detector upon the presence of an apparent horizon.

The input of the sun signal amplifier 75 is connected through a capacitor 76 to the junction of resistors 77 and 78. The values of the resistors 77 and 78 and the value of voltage V are selected so that the voltage at the junction of the resistors is higher than the peak voltage of the amplifier 20 when infra-red radiation from the earth is detected and amplified. Thus, the voltage at the junction of capacitor 79 and resistor 80 is always less positive than the junction between resistors 77 and 78 whenever the earth's infra-red radiation is being detected, and no conduction will occur through diode 81.

If the sun is intercepted by the tracker, the much greater intensity of radiation will cause the positive peak output of the amplifier 20 to be sufficiently large so that the voltage at the junction of capacitor 79 and resistor 80 becomes periodically more positive than the junction of resistors 77 and 78, causing a pulsating conduction through diode 81 to occur. This generates a signal at the input to the sun signal amplifier 75 which is amplified thereby and rectified to a positive D.-C. voltage by filter 82 to oppose the negative voltage $E_1$.

Thus, if the tracker, in its downward search mode, intercepts the sun a negative voltage $E_1$ is produced at the phase sensitive detector 65 which would normally restore the search start trigger 67 to its "off" position to stop the search mode. However, the positive voltage generated by the sun signal amplifier prevents the gating of the search start trigger 67 to its "off" position so that the search mode continues until the earth-space horizon is intercepted.

The sun signal amplifier also keeps the tracker from following the sun in the event that the sun rises above the horizon at the point being scanned by a tracker. The sun signal amplifier 75 will again generate a positive voltage to cancel out the negative voltage $E_1$ and start a complete search mode so that the earth-space horizon will again be tracked when this horizon and the sun are not in the same scanning field.

Even though the temperature of the surface of the moon when illuminated by sunlight is about 100° C., which makes a bright moon a good infra-red radiator, due to the relatively high emissivity of the moon's surface, the moon-space infra-red discontinuity does not provide any significant problem in the present invention. Since the moon subtends only a ½° angle, from the distance of the earth the moon will only be detected in a very small part of the 1° by 8° scanning field. The wave shape from the Schmitt trigger 60 and the D.-C. component thereof will thus drive the line of sight of the tracker down past the moon. At worst, with a tracker viewing part of the moon and the earth horizon at the same time, a slight read-out error will be introduced. However, this will only occur at rare instances and will persist only as long as the moon remains in the scanning field. The moon will not be followed.

It is to be realized that the form of the invention herein shown and described is to be taken as a preferred embodiment of the same and that various changes can be made in the shape, size and arrangement of parts and types of components without departing from the spirit of the invention and the scope of the appended claims.

Having thus described our invention, what we claim and desire to secure by Letter Patent is:

1. A tracker unit comprising: a frame mounted for rotation about a single axis; a mirror mounted on said frame, means for continuously oscillating said mirror relative to said frame through a limited arc solely about an axis parallel to the axis of rotation of said frame, a transducing means mounted on said frame for converting variations of radiation into variations of electrical energy, and an optical means disposed between said mirror and said transducing means for focusing radiation reflected by said mirror onto said transducing means.

2. A tracker unit comprising: a frame, a scanning mirror mounted on said frame, stepping means for incrementally rotating said frame through a relatively large arc to sweep the nominal line of sight of said mirror through predetermined angular increments in a scanning plane fixed in relation to said frame, means for continuously oscillating said mirror through a relatively small arc solely about an axis perpendicular to said scanning plane whereby the line of sight of said mirror may sweep back and forth across a radiation discontinuity disposed in said scanning plane when the line of sight of said mirror is stepped into close coincidence with a line from said mirror to said discontinuity, transducing means on said frame for detecting variations in radiant energy reflected by said mirror and for converting said variation of radiant energy into electrical voltage variations, means for converting said electrical voltage variations into a D.-C. voltage of a magnitude corresponding to the degree of the angle that said nominal line of sight is displaced from a line from said mirror to said radiation discontinuity, and means for producing a D.-C. voltage corresponding to the number of steps that said frame is rotated from one of the limits of said relatively large arc.

3. A tracker unit as set forth in claim 2 and further including means responsive to a steady state output of said transducing means for actuating said stepping means to rotate said frame until the oscillation of the line of sight of said mirror intercepts a radiation discontinuity.

4. A tracker unit as set forth in claim 2 and further including a phase sensitive detector means having signal and control inputs, with one of said inputs being connected to respond to variations in the output of said transducing means and the other of its inputs being connected to said mirror oscillating means, said phase detector means producing a desired output voltage when there are voltage variations produced by said transducing means and when said voltage variations are in a desired phase relationship with the oscillations of said mirror oscillating means, means responsive to a lack of output voltage of said phase detector means for actuating said stepping means to move said frame through its relatively large arc of rotation until said oscillation of the line of sight of said mirror intercepts a radiation discontinuity.

5. In a sensing system for detecting the earth's horizon from a vehicle spaced from the surface of the earth, apparatus comprising: a scanning mirror mounted in said vehicle, stepping means for incrementally moving said mirror to sweep the nominal line of sight of said mirror between the nominal horizontal and nominal vertical axes of said vehicle through predetermined angular increments in a scanning plane fixed in relation to said vehicle whereby the nominal line of sight of said mirror may be brought by steps into close coincidence with a line from said vehicle to said horizon, means for continuously oscillating said mirror through a limited arc solely about an axis perpendicular to said scanning plane whereby the line of sight of said mirror will sweep up and down across said horizon when said mirror is stepped into close coincidence with the line from said vehicle to said horizon, transducing means mounted in said vehicle for incremental movement with said scanning mirror for detecting variations in radiant energy reflected by said mirror and for converting said variations of radiant energy into electrical voltage variations, means for converting said electrical voltage variations into a D.-C. voltage of a magnitude corresponding to the degree of the angle that said nominal line of sight of said mirror is displaced from said horizon, and means for producing a D.-C. voltage of an amplitude corresponding to the number of steps that the nominal line of sight of said mirror is displaced from one of said vehicle axes.

6. In a sensing system for detecting the earth's horizon from a vehicle spaced from the surface of the earth, apparatus comprising: a scanning mirror mounted in said vehicle, stepping means for incrementally moving said mirror to sweep the nominal line of sight of said mirror between the nominal horizontal and nominal vertical axes of said vehicle through predetermined angular increments in a scanning plane fixed in relation to said vehicle whereby the nominal line of sight of said mirror may be brought by steps into close coincidence with a line from said vehicle to said horizon, means for continuously oscillating said mirror through a limited arc solely about an axis perpendicular to said scanning plane whereby the line of sight of said mirror will sweep up and down across said horizon when said mirror is stepped into close coincidence with the line from said vehicle to said horizon, transducing means mounted in said vehicle for incremental movement with said scanning mirror for detecting variations in radiant energy reflected by said mirror and for converting said variations of radiant energy into electrical voltage variations, bistable trigger means actuated by variations of electrical voltage produced by said last-named means for producing a rectangular wave of fixed amplitude, filter means for detecting the D.-C. component of said rectangular wave, and means for producing a D.-C. voltage of an amplitude corresponding to the number of steps that the nominal line of sight of said mirror is displaced from one of said vehicle axes.

7. A sensing system as set forth in claim 6 and further including: second trigger means connected to the output of said filter means and operable by a predetermined high D.-C. component of said rectangular wave, means responsive to operation of said second trigger means for actuating said stepping means to move said mirror in a direction to decrease the D.-C. component of said rectangular wave, third trigger means connected to the output of said filter means and operable by a predetermined low D.-C. component of said rectangular wave, means responsive to operation of said third trigger means for actuating said stepping means to move said mirror in a direction to increase the D.-C. component of said rectangular wave.

8. A sensing system as set forth in claim 6 and further including means responsive to a steady state output of said transducing means for actuating said stepping means to move said mirror until said oscillation of the line of sight of said mirror intercepts said horizon.

9. A sensing system as set forth in claim 8 and further including means responsive to a magnitude of voltage produced by said transducer means when subjected to radiation from the sun for actuating said stepping means to move said mirror until said oscillation of the line of sight of said mirror intercepts said horizon.

10. A sensing system as set forth in claim 6 and further including means responsive to a steady state output of said transducing means for actuating said stepping means to move said mirror without stopping to nominal horizontal position, and means responsive to movement of said mirror to nominal horizontal position for actuating said stepping means to translate said mirror until said oscillation of the line of sight of said mirror intercepts said horizon.

11. A sensing system as set forth in claim 6 and further including phase sensitive detector means having signal and control inputs, with one of said inputs being connected to respond to variations in the output of said transducing means and the other of said inputs being connected to said mirror oscillating means, said phase detector means producing a desired output voltage when there are voltage variations produced by said transducing means and when said voltage variations are in a desired phase relationship with the oscillations of said mirror oscillating means, means responsive to an absence of said desired output voltage of said phase detector means for actuating said stepping means to move said mirror until said oscillation of the line of sight of said mirror intercepts said horizon.

References Cited by the Examiner
UNITED STATES PATENTS

| | | | |
|---|---|---|---|
| 2,855,521 | 10/1958 | Blackstone | 250—235 X |
| 2,981,842 | 4/1961 | Kaufold et al. | 250—83.3 |
| 3,003,026 | 10/1961 | Astheimer | 250—83.3 X |
| 3,020,407 | 2/1962 | Merlen | 250—83.3 |
| 3,025,515 | 3/1962 | Fairbanks | 250—83.3 X |

RALPH G. NILSON, *Primary Examiner.*

ARCHIE R. BORCHELT, *Examiner.*